United States Patent [19]
Palmersheim et al.

[11] Patent Number: 6,081,954
[45] Date of Patent: Jul. 4, 2000

[54] DOCK LEVELER WITH LINEARLY TRANSLATABLE LIP

[75] Inventors: Gerard M Palmersheim, Hubertis; Kenneth Gelder, West Bend, both of Wis.

[73] Assignee: Systems, Inc., Germantown, Wis.

[21] Appl. No.: 09/042,904

[22] Filed: Mar. 17, 1998

[51] Int. Cl.[7] ..................................................... E01D 1/00
[52] U.S. Cl. ............................................. 14/69.5; 14/71.1
[58] Field of Search ................... 14/69.5, 71.1, 14/71.3, 71.7

[56] References Cited

U.S. PATENT DOCUMENTS

| | | | |
|---|---|---|---|
| 2,993,219 | 7/1961 | Pennington | 14/71.7 |
| 3,184,773 | 5/1965 | Breneman | 14/69.5 |
| 4,455,703 | 6/1984 | Fromme et al. | 14/71.3 |
| 4,662,021 | 5/1987 | Hagen et al. | 14/71.3 |
| 4,670,928 | 6/1987 | Alten | 14/71.3 |
| 4,727,613 | 3/1988 | Alten | 14/71.1 |
| 4,862,547 | 9/1989 | Alten | 14/71.1 |
| 5,068,938 | 12/1991 | Roscoe | 14/71.7 |
| 5,553,343 | 9/1996 | Alexander | 14/71.1 |
| 5,636,399 | 6/1997 | Tremblay et al. | 14/71.1 |
| 5,845,356 | 12/1998 | Kielinski | 14/69.5 |

FOREIGN PATENT DOCUMENTS

| | | | |
|---|---|---|---|
| 2457063 | 6/1976 | Germany | 14/71.3 |
| 2545708 | 4/1977 | Germany | 14/71.3 |
| 2915262 | 10/1980 | Germany | 14/71.3 |

*Primary Examiner*—James A. Lisehora
*Attorney, Agent, or Firm*—Christensen O'Connor Johnson & Kindness PLLC

[57] ABSTRACT

A loading dock includes a dock leveler movable between raised and lowered positions. The dock leveler includes a dock board and a lip assembly that can be horizontally extended and retracted relative to the forward edge of the dock board. The ability of the lip to extend and retract horizontally means that the dock board does not have to be raised as far to extend the lip as in prior dock levelers having a pivotally mounted lip. This eliminates or reduces the need for toe protection structure at the sides of the dock board and enhances manufacturing economy without compromising safety.

35 Claims, 8 Drawing Sheets

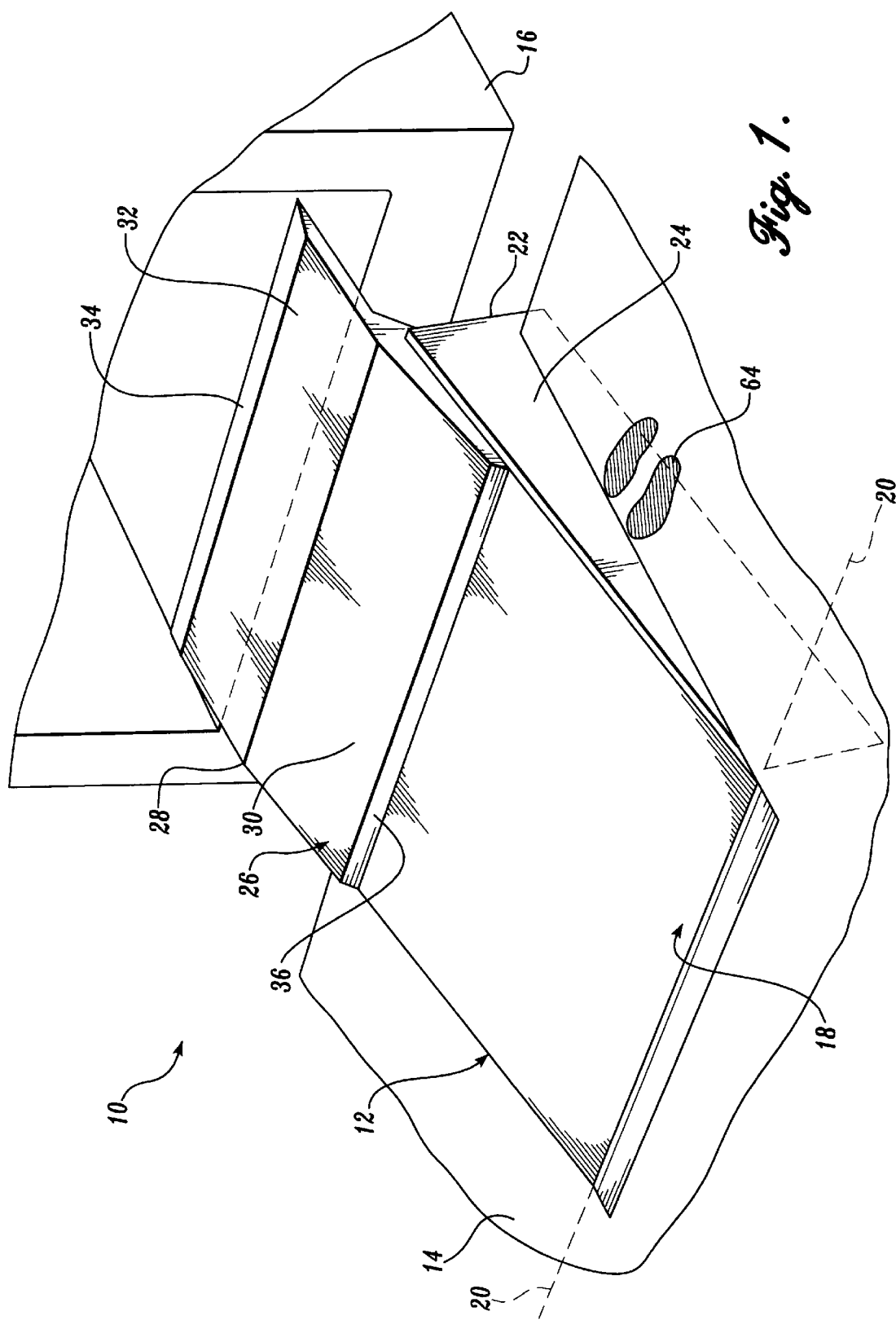

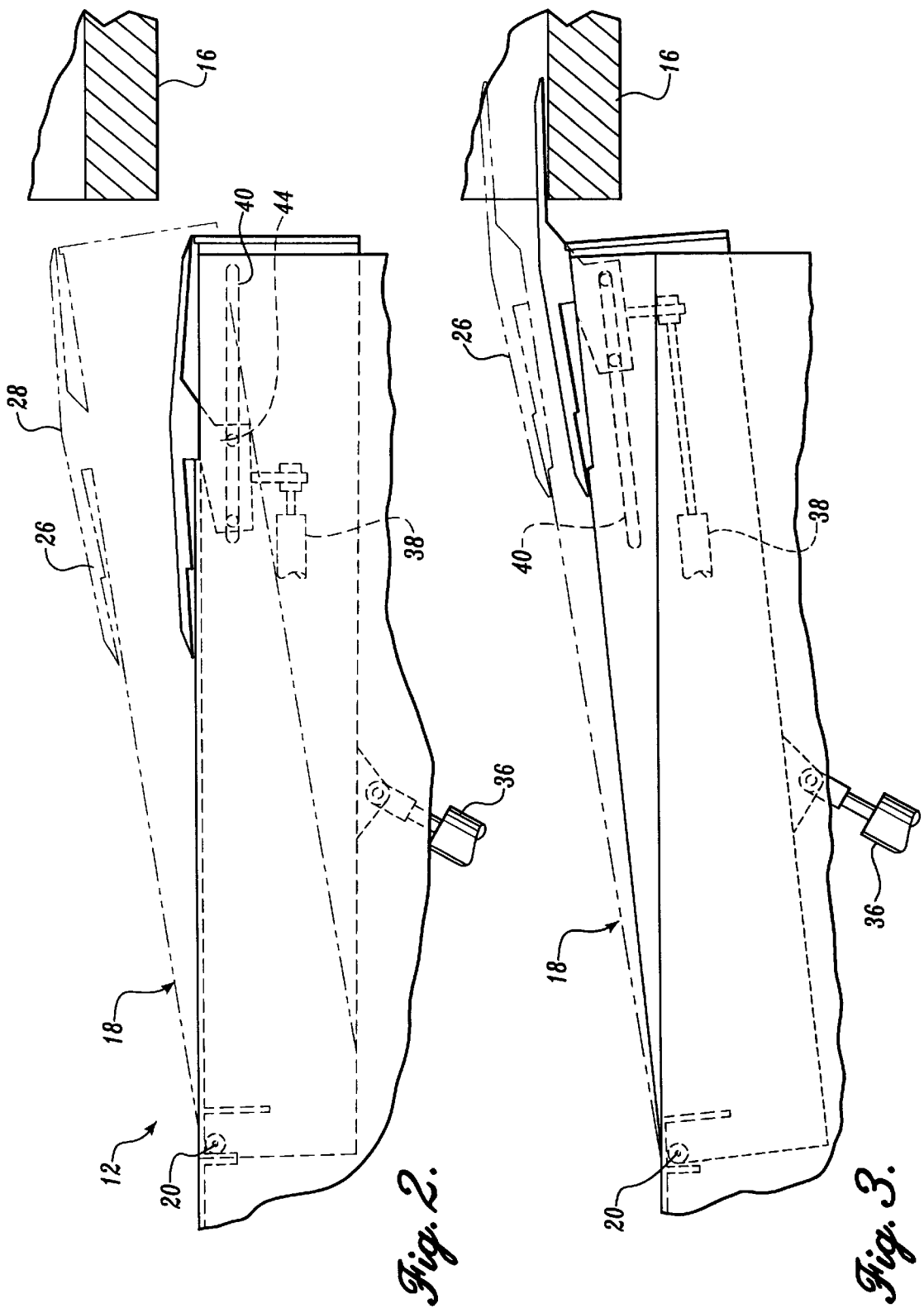

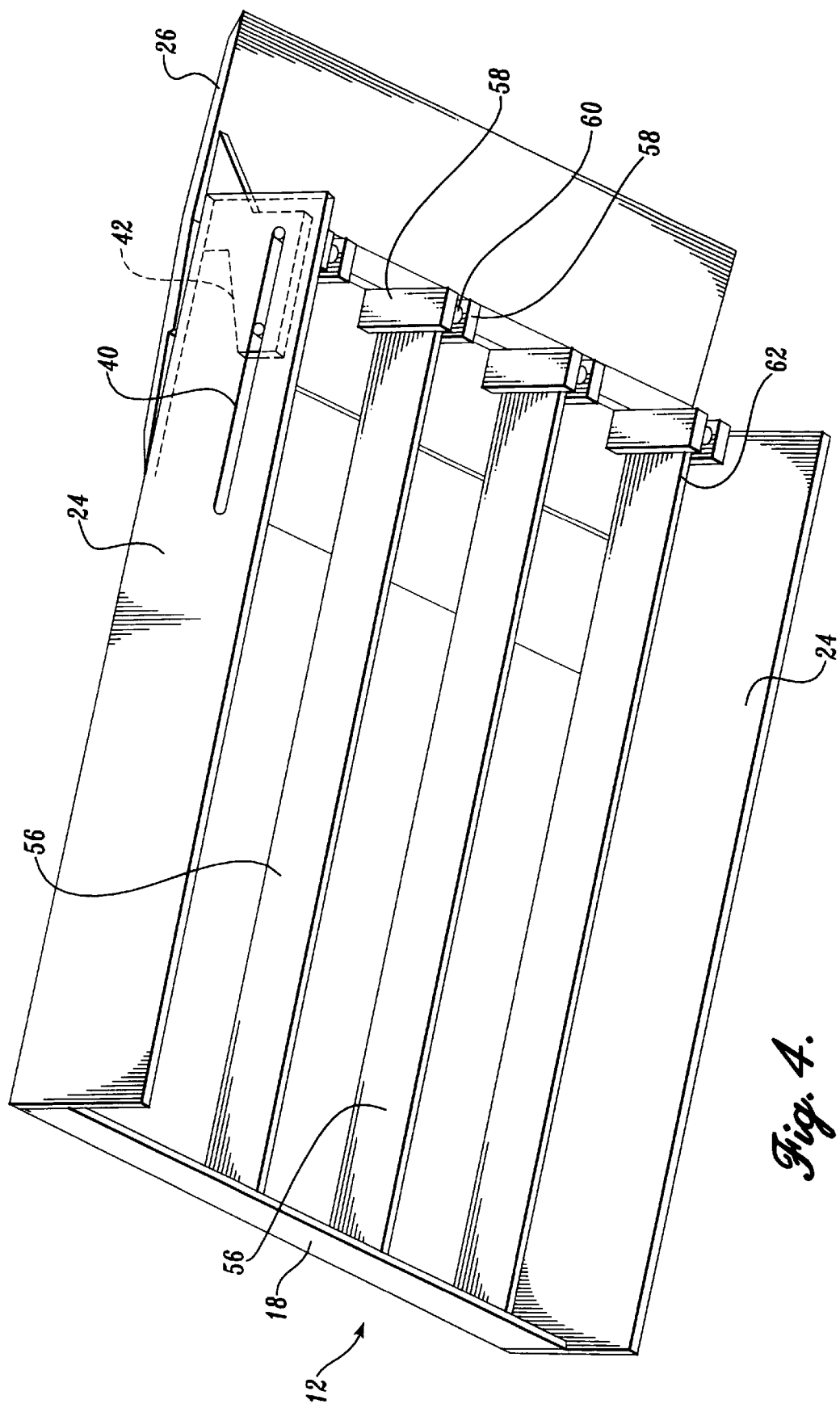

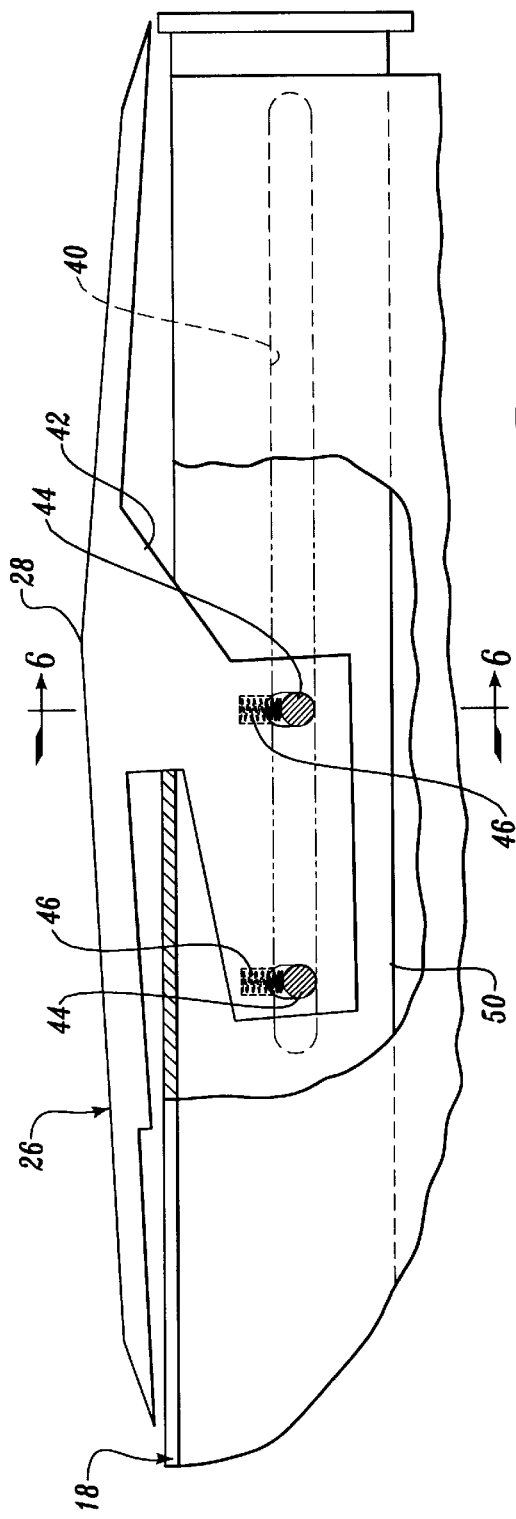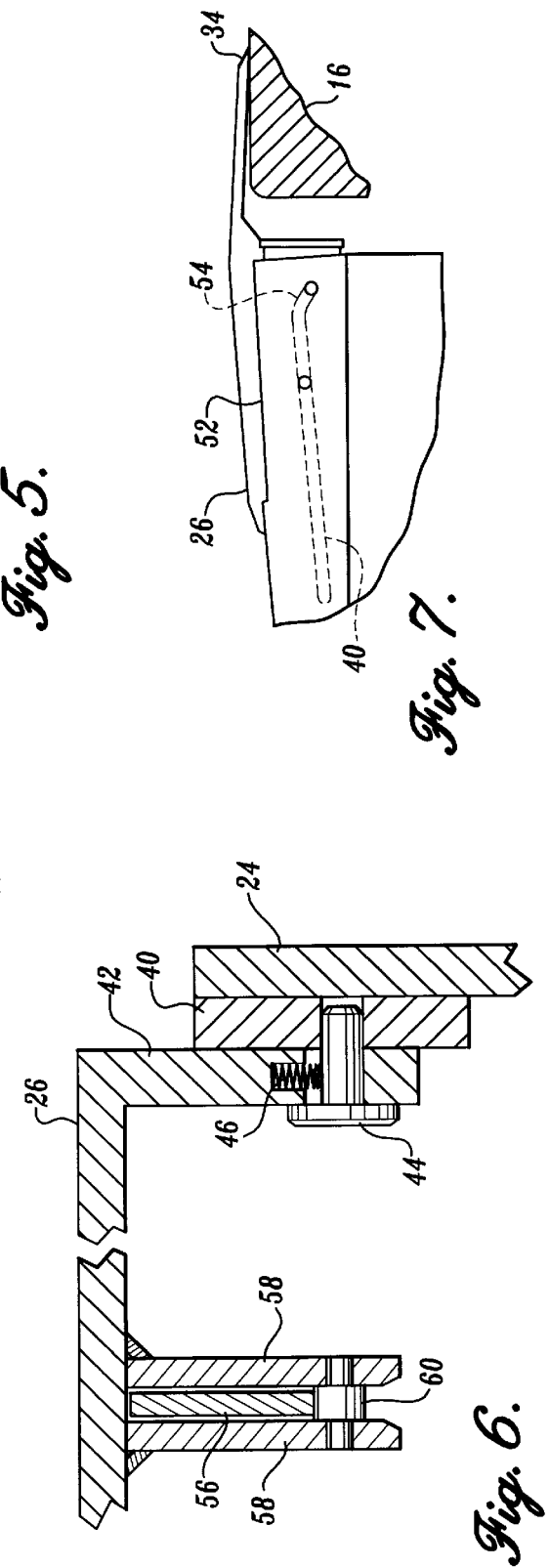

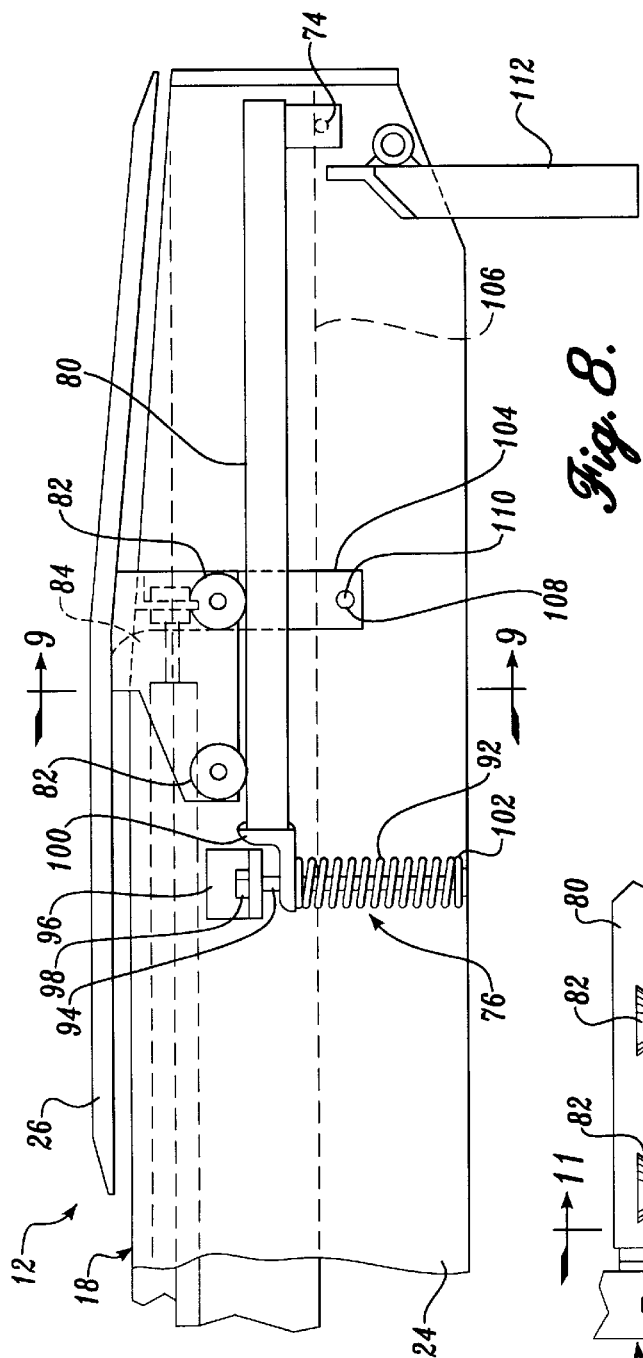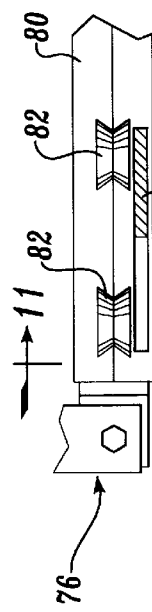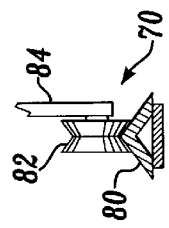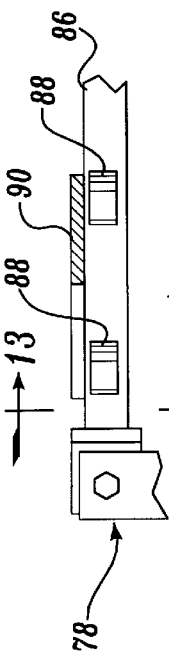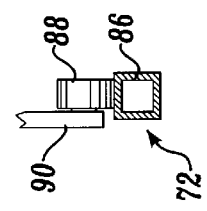

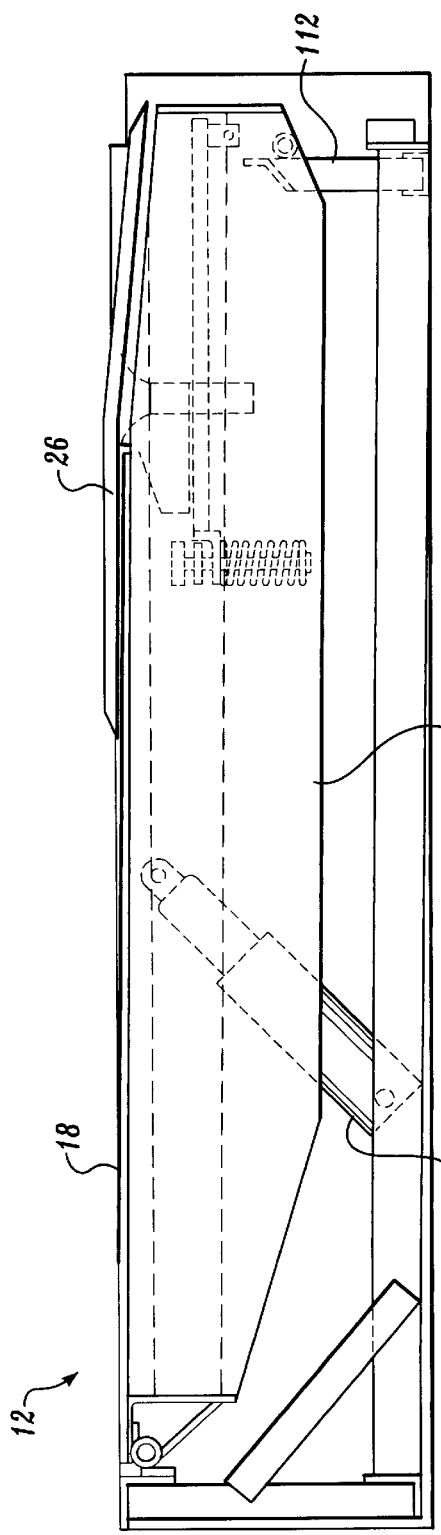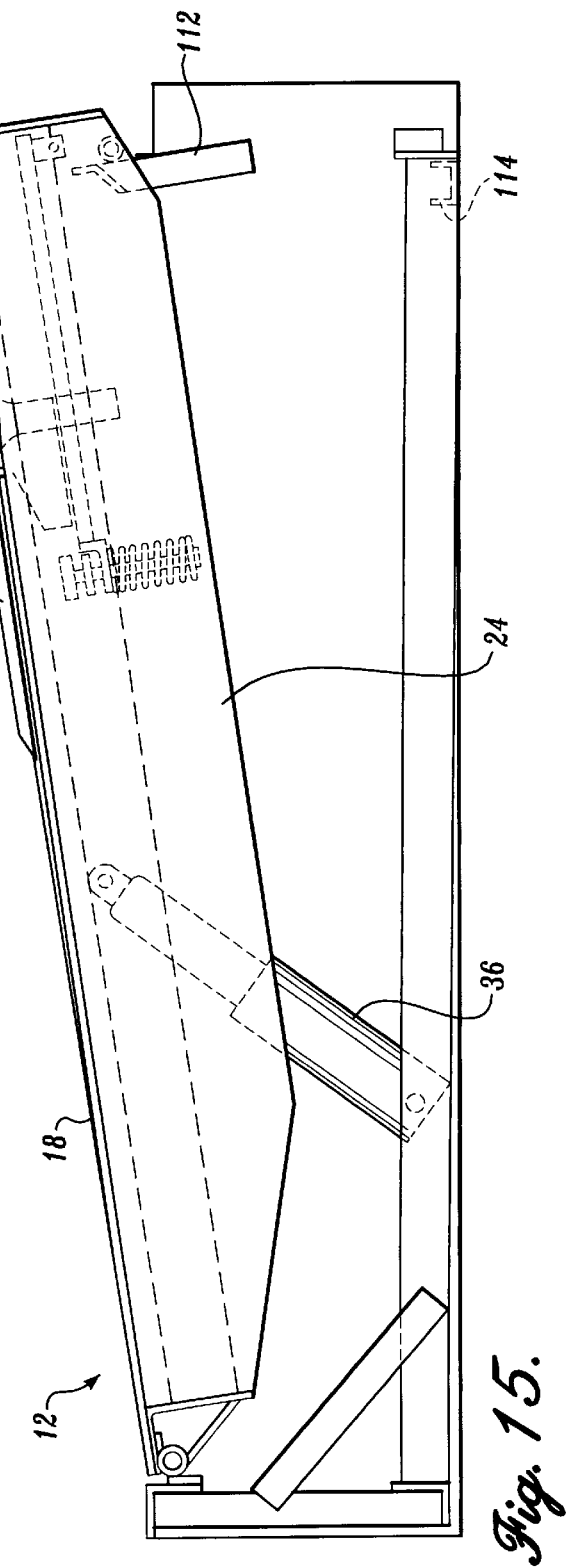

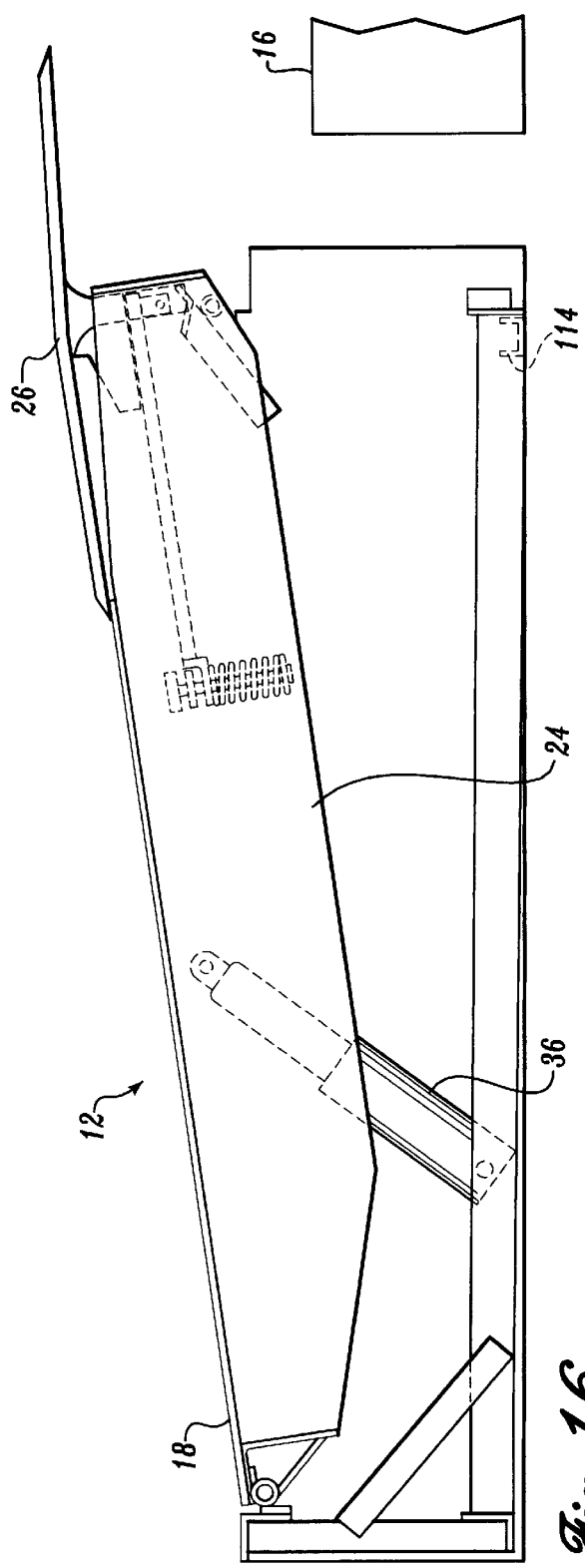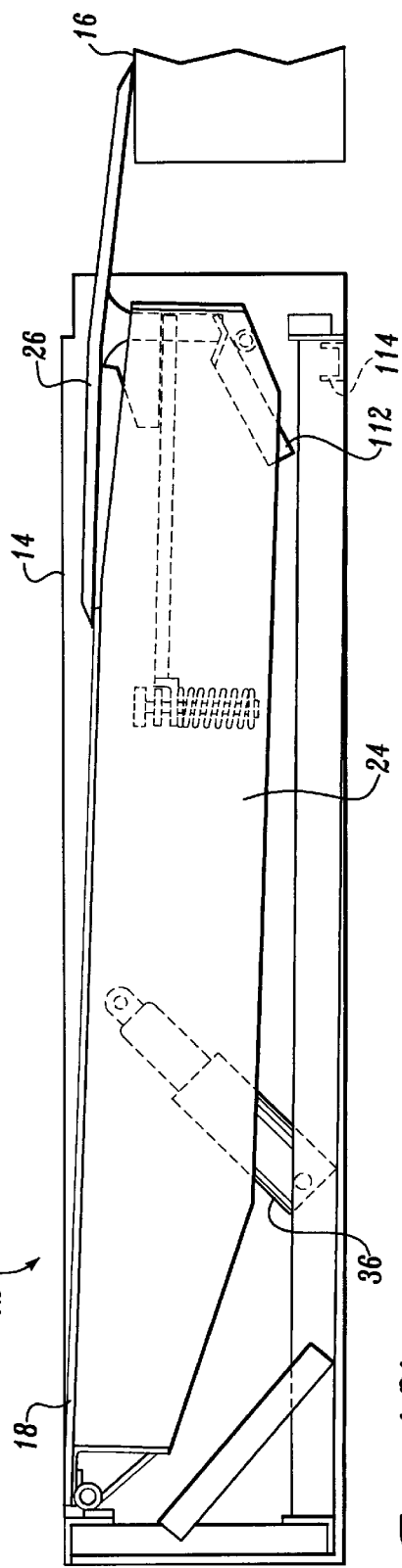

DOCK LEVELER WITH LINEARLY TRANSLATABLE LIP

BACKGROUND OF THE INVENTION

This invention relates generally to dock levelers. More particularly, the invention relates to lip structures that provide the final transition between a dock leveler or dock board and the interior of a truck trailer.

Dock levelers and dock boards are widely used to provide a transition between a loading dock and the interior of a truck trailer. Such devices enable fork lifts and similar vehicles to transit from a warehouse, factory or other loading dock area into a truck trailer and then back again. This simplifies the loading and unloading of trucks.

For a number of reasons, it is impractical to ensure that the bed of every truck trailer is kept at precisely the same height above ground at all times. This dimension changes with such factors as manufacturing variations, loadings, tire pressures, suspension sag etc. Accordingly, modern dock levelers function to accommodate variations in truck trailer height and to provide a ramp up or down as needed to form a smooth transition between the loading dock and the interior of the truck trailer.

Although dock levelers are generally heavy duty pieces of equipment manufactured from thick steel, the actual interface between the dock leveler and the interior of a truck trailer is preferably formed by a carefully shaped shelf or lip carried at the extreme forward end of the dock leveler. This helps provide a smooth transition between the dock leveler and the truck trailer interior that improves safety and comfort for the fork lift operator and helps simplify and speed the loading or unloading operation.

The simplest form of lip has been a "throw over" plate that was dropped into position over the juncture between the dock and the end of the truck trailer. Although effective, the throw over plate has serious drawbacks. In the first place, the throw over plate is an entirely separate unit that can be misplaced or lost. Additionally, it is often a heavy piece of metal that is difficult to maneuver and position without considerable body strength. Finally, proper positioning of the throw over plate depends substantially on the care and skill of the operator. Inattentive or indifferent concern on the part of the operator can result in an unsafe condition.

More advanced forms of lips include mechanisms located at the forward end of a dock leveler. Typically, a lip plate is hinged or otherwise pivotally mounted at the end of the dock leveler. To place the dock leveler in use, the dock leveler is first raised and the lip then pivoted outwardly. The dock leveler is then dropped until the lip comes to rest in the interior of the truck trailer. To provide adequate clearance for pivoting the lip, it is often necessary to raise the dock leveler well above the height needed to match the truck trailer height. To avoid potential pinch hazards created as the dock leveler is raised to such extreme levels, elaborate guard mechanisms are often employed along the sides of the dock leveler. Such mechanisms are intended to block any gaps between the sides of the dock leveler and the floor of the loading dock area to keep hands, feet and toes from getting caught therebetween. Although effective, such guards are often complicated telescoping or folding mechanisms that are difficult to construct and that increase the overall cost of the dock leveler substantially.

SUMMARY OF THE INVENTION

The invention provides a dock leveler comprising a dock board having an upper surface and a forward end. The dock leveler further includes a lip positioned adjacent the forward end and horizontally translatable between a retracted position wherein the lip is substantially fully inboard of the forward end and an extended position wherein a portion of the lip projects forwardly of the forward end.

The invention also provides a lip assembly for a dock leveler comprising an elongate rigid plate and mounting structure coupled to the plate for mounting the plate to a dock leveler for substantially linear movement between a retracted position wherein the plate is substantially fully inboard of the edges of the dock leveler and an extended position wherein a portion of the plate projects past an edge of the dock leveler.

The invention also provides a dock leveler comprising a substantially rectangular dock board having a forward edge, a rear edge, a pair of spaced side edges and a substantially planar upper surface. The dock leveler further includes mounting structure for mounting the dock board for pivoting movement around a substantially horizontal axis so that the forward edge of the dock board can be raised and lowered relative to the rear edge. The dock leveler further includes a substantially rectangular lip mounted adjacent the upper surface of the dock board for substantially horizontal movement between an extended position wherein a portion of the lip projects forwardly of the forward end of the dock board by a distance sufficient to engage the interior floor surface of a truck trailer when a truck trailer is positioned adjacent the dock board, and a retracted position wherein the lip does not project forwardly of the forward end of the dock board to so engage the floor surface of a truck trailer.

In one embodiment, the upper surface of the lip is crowned.

In one embodiment, the lip is biased to a position slightly above the level of the upper surface of the dock board.

In one embodiment, the lip is mounted to the dock board for substantially horizontal, linear movement by means of a track assembly.

In one embodiment, the forward end of the dock board is tapered downwardly and the lip is biased downwardly by means of a cam mechanism actuated when the lip is fully extended.

It is an object of the invention to provide a new and improved dock leveler for use in loading docks.

It is a further object of the invention to provide a new and improved dock leveler that avoids the need to raise the dock leveler substantially above the final use position in order to extend the lip.

It is a further object of the invention to provide a new and improved dock leveler that avoids the need for complicated toe protection structure adjacent the sides of the dock board without compromising safety.

It is a further object of the invention to provide a new and improved dock leveler that is durable and rugged in use and economical in manufacture.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 1 is a perspective view of a loading dock equipped with a dock leveler having a horizontally translatable lip in accordance with various aspects of the invention.

FIG. 2 is a side elevation view of the dock leveler shown in FIG. 1 showing the lip in a retracted position as the dock leveler is being raised.

FIG. 3 is a side elevation view, similar to FIG. 2, showing the lip extended to a use position.

FIG. 4 is a perspective view of the underside of the dock leveler shown in FIGS. 1, 2 and 3 useful in understanding the construction and operation thereof.

FIG. 5 is a fragmentary side elevation view of the horizontally translatable lip structure, useful in understanding the construction and operation thereof.

FIG. 6 is a cross-sectional view of the dock leveler shown in FIG. 5 taken along line 6—6 thereof.

FIG. 7 is a fragmentary side elevational view of an alternate embodiment horizontally translatable lip structure embodying various features of the invention.

FIG. 8 is a fragmentary side sectional view of still another preferred embodiment of horizontally translatable lip structure embodying various features of the invention.

FIG. 10 is a fragmentary top view of a first floating rail structure for supporting one side of the translatable lip shown in FIGS. 8 and 9.

FIG. 11 is a cross-sectional view of the floating rail structure shown in FIG. 10 taken along line 11—11 thereof.

FIG. 12 is a fragmentary top view of a second floating rails structure for supporting the other side of the translatable lip shown in FIGS. 8 and 9.

FIG. 13 is cross-sectional view of the floating rail structure shown in FIG. 12 taken along line 13—13 thereof.

FIG. 14 is side elevational view of the dock leveler shown in FIG. 8 showing the dock leveler in an idle or storage position.

FIG. 15 is a side elevational view, similar to FIG. 14, showing the dock leveler being raised from the storage position to initiate placing the dock leveler into use.

FIG. 16 is a side elevational view, similar to FIGS. 14 and 15, showing the horizontally translatable lip being extended to place the dock leveler into use.

FIG. 17 is a side elevational view, similar to FIGS. 14, 15 and 16, showing the dock leveler being lowered to place the lip into contact with the interior of a truck trailer and thereby place the dock leveler into use.

DESCRIPTION OF THE PREFERRED EMBODIMENTS

Figure 9:
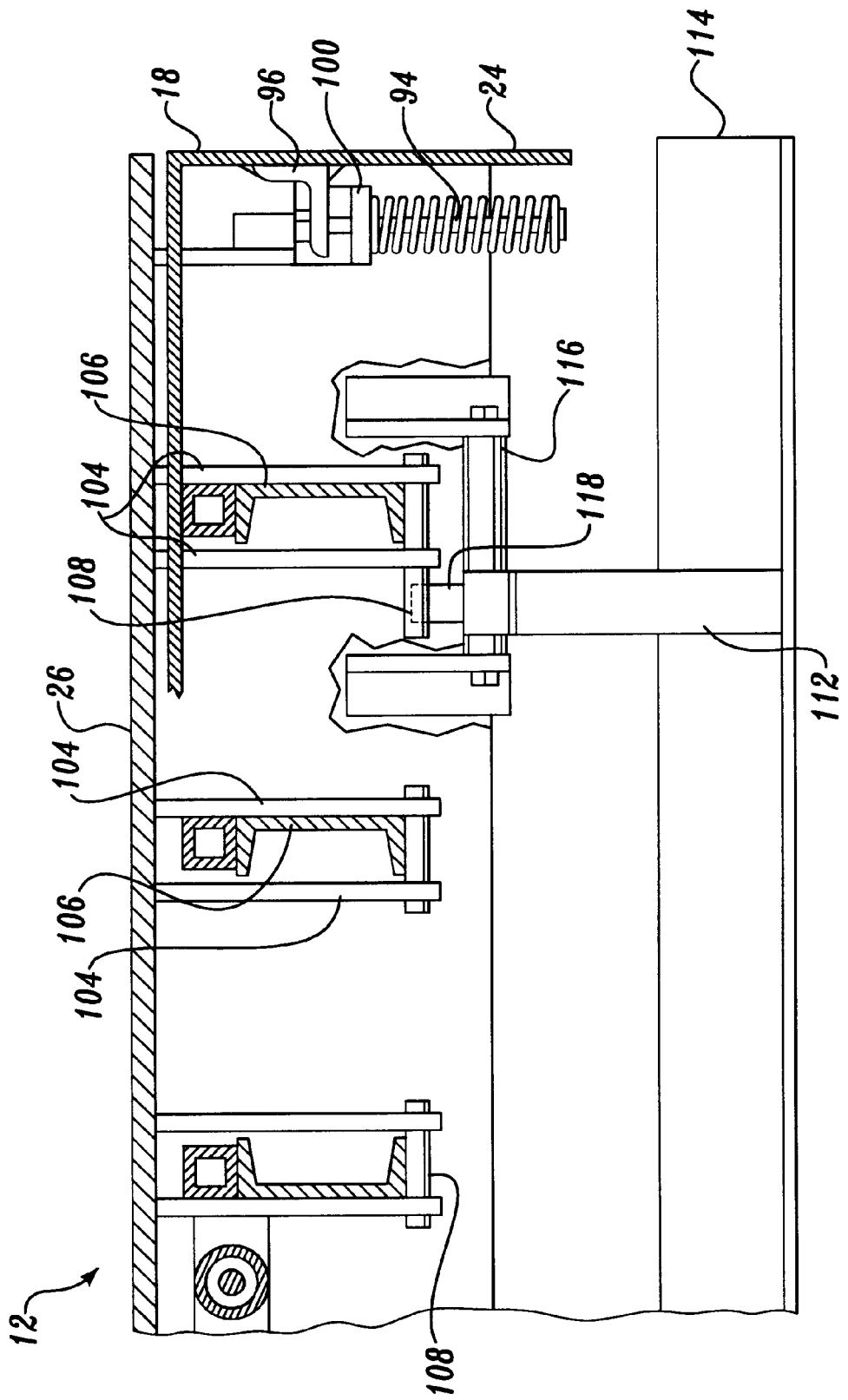
FIG. 9 is cross-sectional view of the horizontally translatable lip structure shown in FIG. 8 taken along line 9—9 thereof.

Referring to the drawings, and, in particular to FIGS. 1, 2 and 3, a loading dock 10 including a dock leveler 12 embodying various features of the invention is illustrated. The loading dock, in accordance with conventional practice, is located adjacent the vertical exterior wall of a factory, warehouse or similar facility. The dock leveler 12 is mounted within a pit formed in the floor 14 of the facility. An opening in the wall of the facility allows goods to be loaded into, or unloaded from, a truck trailer 16 when the trailer is backed up against the loading dock 10. Typically, an overhead door is provided for closing the opening in the wall when the loading dock is not in active use.

The dock leveler 12 serves as a bridge between the floor 14 of the loading dock and the bed of the truck trailer 16. Because truck trailer beds are not all of uniform height above ground, the dock leveler can be pivoted up or down relative to the dock floor 14. The dock leveler 12 thus serves as a ramp that enables fork trucks and people to traverse between the facility and the interior of the truck trailer 16.

The dock leveler 12 comprises a generally rectangular dock board 18 having a forward edge, a rear edge, a pair of spaced side edges and a substantially planar upper surface. The dock board 18 is mounted within the pit by means of any number of known mounting structures for pivoting movement around a horizontal pivot axis 20 adjacent the rear edge of the dock board 18. Such pivoting movement enables the forward end 22 of the dock board 18 to be raised or lowered relative to the floor of the facility and the bed of the truck trailer 16. A pair of side panels 24 extend downwardly along the sides of the dock board 18 as shown.

In accordance with one aspect of the invention, the dock leveler 12 includes, adjacent its forward end, a linearly or horizontally translatable lip 26. (It will be appreciated that, as used herein, "horizontally" is used with reference to the upper surface of the dock board 12 rather than to the surface of the earth.) The lip 26 is linearly, and substantially horizontally translatable between a retracted position (FIG. 2), wherein the lip is substantially fully inboard of the forward end of the dock board 18, and an extended position (FIG. 3), wherein a portion of the lip projects forwardly of the forward end of the dock board 18. The lip 26 comprises a generally rectangular plate oriented substantially adjacent and parallel with the upper surface of the dock board 18. A mounting mechanism (described below) enables the lip 26 to move forward and back relative to the dock board 18 between the extended and retracted positions.

Preferably, the lip 26 is crowned as shown. This causes the lip 26 to extend somewhat above the level of the upper surface of the dock board 18 and thus form a hump or "speed bump" 28. When the dock board is not in use and the lip 26 is in the retracted position, the "speed bump" 28 serves to alert the operator of a fork truck or similar vehicle that the vehicle is approaching the outboard end of the dock board 18 and that the operator should be careful against driving the vehicle off the end of the dock board. The "speed bump" 28 thus provides an additional warning and is meant to supplement, rather than substitute for, other safety features, such as physical barriers, provided for avoiding such accidents.

As best seen in FIG. 1, the lip 26 includes two angularly oriented, substantially rectangular panels 30 and 32. The angular orientation of the panels 30, 32 creates the hump or "speed bump" 28. Preferably, the leading and trailing edges 34, 36 of the lip are beveled as shown to provide a smooth transition between the lip 26 and the dock board 18 and between the lip 26 and the bed of the truck trailer 16.

Referring to FIGS. 2 and 3, the dock board 18 is raised and lowered by means of a hydraulic cylinder 36 positioned below, and coupled to, the dock board 18. Extension and retraction of the cylinder 36 pivots the dock board around the pivot axis 20 to raise and lower the leading edge of the dock board 18. It will be appreciated that various known mechanisms and techniques have been developed, and can be used, for raising and lowering the dock board 18. For example, the dock board 18 can be raised and lowered manually, or by electric motors or by different arrangements of hydraulic cylinders beyond that shown here. The exact manner in which the dock board 18 is raised and lowered is not critical.

The lip 26 is moved between the retracted and extended positions by various means. In the illustrated embodiment, an additional hydraulic cylinder 38, coupled between the dock board 18 and the lip 26, performs this function. When the cylinder 38 is extended, the lip 26 is pushed to the extended position shown in FIG. 3. When the cylinder 38 is retracted, the lip 26 is pulled back to the retracted position shown in FIG. 2. It will be appreciated that other mechanisms and techniques can be used for extending and retracting the lip 26. For example, a manually operable linkage can be provided. Or electric motors can be used. Still other arrangements of hydraulic cylinders beyond that shown here can be used.

The lip 26 is preferably mounted for substantially horizontal movement relative to the dock board 18 by means of a pair of tracks 40 mounted along the side panels 24 of the dock board 18. Elements coupled to the lip 26 are confined within and move along the tracks 40 as the lip 26 moves. In the illustrated embodiment, the lip 26 includes a pair of downwardly depending support plates or wings 42 that extend alongside the side panels 24 of the dock board 18. A pair of wheels 44 coupled to each of the support plates 42 and confined within the tracks 40 permit the lip 26 to move linearly relative to the dock board 18 between the extended and retracted positions.

To reduce friction and thereby make it easier to move the lip 26 between the retracted and extended positions, the lip 26 is preferably biased to a position slightly above the upper surface of the dock board 18. In the illustrated embodiment, this is accomplished by means of a plurality of springs 46 coupled between the wheels 44 and the support plates 42. The springs 46 are sufficiently stiff so as to support the full weight of the lip 26 and thereby keep the underside of the lip from scraping against the dock board 18 as the lip is moved between the extended and retracted positions. The springs 46 are sufficiently soft so that the lip 26 presses down against the upper surface of the dock board 18 and the bed of the truck trailer 16 under the weight of a fork truck or similar vehicle. By thus avoiding friction between the lip 26 and the upper surface of the dock board 18, relatively little energy is required to move the lip 26 between the extended and retracted positions.

In the illustrated embodiment, the lip 26 is preferably suspended approximately ¼ inch above the upper surface of the dock board 18 when no weight is on the lip 26. As best seen in FIGS. 5 and 6, the wheel 44 pass through vertically elongated slots 48 formed in the support plates 42. The vertical length of each slot 48 defines the range of vertical motion available to the lip 26 and can be used to determine the distance by which the lip 26 is suspended above the dock board 18 when the lip 26 is unloaded.

As further illustrated in FIG. 5, each support plate 42 joins the lip panels 30, 32 adjacent their juncture under the "speed bump" 28. Additionally, each support plate 42 includes a lower section 50 that extends rearwardly from under the center of the lip 26. The slots 48 and wheels 44 are laterally spaced substantially at the ends of the lower section 50 so that each pair of wheels 44 on each support plate 42 is separated by several inches. The lateral spacing of the wheels 44 enables the lip 26 to resist twisting moments as loads are transported across the lip. Nevertheless, the elongated slots 48 permit limited pivoting movement of the lip 26 relative to the upper surface of the dock board 18 as loads are transported over the lip. This limited pivoting movement of the lip 26 ensures that the forward edge 34 of the lip presses tightly against the bed of the truck trailer 16 when weight is forward on the lip 26 (i.e., a load is moving into the truck) and that the trailing edge 36 of the lip 26 presses tightly against the upper surface of the dock board 18 when weight is to the rear of the lip 26 (i.e., a load is moving onto the dock board 18).

In the embodiment illustrated in FIGS. 1–6, the side panels 24 of the dock board 18 are substantially straight along their upper edges. In an alternate embodiment shown in FIG. 8, the forward upper edges 52 of the side panels 24 are tapered downwardly as shown. This configuration enables the lip 26 to assume a slightly downwardly canted orientation when extended that, in turn, results in a smooth transition between the forward edge 34 of the lip 26 and the bed of the truck 16. As further shown in FIG. 7., the forwardmost end 54 of each track 40 can be curved downwardly to provide a cam effect that pulls the forward end of the lip 26 down as the lip reaches its fully extended position. As the wheels 44 reach the forward end of the track 40, the curved portion 54 pulls the wheels 44, and, thus the lip 26, down relative to the dock board 18.

Referring to FIG. 4, the dock board 18 is provided along its underside with a plurality of elongate, downwardly depending stiffeners 56 that stiffen and strengthen the dock board 18. Additionally, pairs of downwardly extending legs 58 extend from the underside of the lip 26 along each side of each stiffener 56. A wheel, pin or similar engaging element 60 is supported between each pair of legs 58 and engages the underside of each stiffener 56 as shown. This helps support the lip 26 and further enables the lip 26 to resist twisting moments as loads are transported over the lip. Optionally, the forward edge of each stiffener 56 can be curved downwardly to form a ramped or cam surface 62 that, when engaged by the engaging element 60 as the lip 26 reaches the fully extended position, pulls the lip 26 downwardly into firm engagement with the dock board 18.

Still another preferred form of dock leveler embodying the invention is shown in FIGS. 8–17. In this embodiment, the linearly translatable lip 26 is supported for linear movement by means of two pivoting or floating track assemblies 70, 72 disposed along the side panels 24 of the dock board 18. The forward end of each track assembly 70, 72 is pivotally joined to the dock board 18 for pivoting movement around a horizontal pivot axis 74, and the rearward end of each track assembly 70, 72 is upwardly biased by means of separate spring assemblies 76, 78. The bias provided by the spring assemblies 76, 78 keeps the track assemblies 70, 72, respectively, substantially parallel to the upper surface of the dock board 18 but permit limited pivoting movement of the track assemblies around the pivot axis 74 in the counter-clockwise direction as viewed in FIG. 8.

Referring to FIGS. 10 and 11, the first track assembly 70 preferably comprises a track 80 formed of a length of rigid "angle" stock that is oriented with its apex uppermost. A pair of "V" shaped wheels 82 that are rotatably mounted on a first support bracket 84 extending downwardly from the lip 26 ride along the track 80 to support the lip 26 for linear movement.

Referring to FIGS. 12 and 13, the second track assembly 72 preferably comprises a track 86 formed of a length of rigid square sectioned stock having a flat upper surface. A pair of flat wheels 88 that are rotatably mounted on a second support bracket 90 extending downwardly from the lip 26 ride along the track 86 to support the lip 26 for linear movement.

Referring to FIGS. 8 and 9, the spring assemblies 76 and 78 each include a coil spring 92 that supports the rearward end of each track 80, 86 respectively. Each coil spring 92 is positioned around a vertical bolt 94 that extends through a support bracket 96 mounted on the side plate 24. A nut 98 is threaded onto the end of the bolt 94, and the spring 92 is confined between an end bracket 100 affixed to the end of the adjacent track 80, 86 and a washer 102 under the head of the bolt 94. The coil springs 92 bias the rearward ends of the tracks 80, 86 upwardly with a bias force that can be adjusted by tightening or loosening the nut 98. Preferably, the bias force is adjusted so that the tracks 80, 86 support the lip 26 above the upper surface of the dock board 18 when the lip 26 is unloaded, but permit the lip to move downwardly toward the dock board under externally applied forces.

It will be appreciated that the use of an angularly sectioned track 80 in combination with the V-shaped wheels 82 in the track assembly 70 function to fix the side-to-side position of the lip 26 relative to the dock board 18. The flat upper surface of the track 86 in combination with the flat wheels 88 of the track assembly 72 allows the wheels 88 to self-adjust their positions relative to the track 86. Accordingly, the lateral position of the lip 26 relative to the dock board 18 can be fixed by appropriately locating only the track assembly 70. The other track assembly 72 automatically adjusts itself without further effort.

Referring further to FIGS. 8 and 9, it will be seen that a plurality of spaced, parallel brackets 104 extend downwardly from the underside of the lip 26 and straddle individual ones of a plurality of support beams 106 extending forwardly along the dock board 18. A roller pin 108 mounted across the lower ends of each pair of brackets 104 engages the underside of the straddled beam 106 and enables the lip 26 to pivot or rock relative to the dock board 18 around a pivot axis 110 defined by the aligned centers of the roller pins 108.

As further illustrated in FIGS. 8 and 9, a plurality of support legs or stops 112 are provided along the forward edge of the dock board 18 and support the dock board 18 when it is in its storage or idle position (FIG. 14.) The lower end of each stop 112 rests on a support channel 114 mounted under the dock board 18. This keeps the forward end of the dock board 18 from dropping and enables the dock board 18 to support the weight of a person or fork truck when the dock board 18 is in the idle position.

As illustrated in FIGS. 14–17, it is sometimes necessary to allow the forward end of the dock board 18 to drop below the level of the floor. This can occur, for example, when the floor of a truck trailer is lower than the level of the dock floor. To enable the dock board 18 to drop below floor level, the stops 112 are pivotally mounted to the dock board 18 and are configured to pivot backwardly out of the way when the lip 26 is extended. As best seen in FIGS. 8 and 9, each stop 112 is pivotally attached at its upper end to a horizontal pivot axis 116 mounted to the forward face of the dock board 18. Ordinarily, each stop 112 hangs vertically under its own weight. As further illustrated, a tab 118 projects upwardly from each stop 112. The stops 112 are positioned along the front face of the dock board 18 so as to be in the path of the brackets 104 so that the roller pins 108 engage the tabs 118 when the lip 26 is fully extended. This has the effect of pivoting the stops 112 backwardly away from the vertical position as best seen in FIG. 16. When the lip 26 is retracted, the stops 112 once again swing to the vertical position.

Operation of the dock leveler 12 is best understood by reference to FIGS. 14–17. In the idle or storage position shown in FIG. 14, the lip 26 is retracted and the stops 112 are received in the support channel 114. The spring bias of the springs 92 holds the lip 26 somewhat above the upper surface of the dock board 18.

To place the dock leveler 12 into use, the cylinder 36 is extended, which has the effect of raising the dock board 18 to the position shown in FIG. 15. Next, the lip 26 is fully extended, which has the effect of pivoting the stops 112 back to the position shown in FIG. 16. Then, the cylinder 36 is retracted as needed to bring the forward end of the lip 26 into contact with the bed of the truck trailer 16. Because the fully extended lip 26 has the effect of swinging the stops 112 back and out of the way, it is possible for the dock board 18 to be lowered below the level of the facility floor 14 if need be.

It will be appreciated that, as the dock board is lowered and the front edge of the lip 26 contacts the truck trailer bed 16, the lip itself will pivot backwardly around the roller pins 108. This has the effect of forcing the rear edge of the lip 26 downwardly into firm contact with the upper surface of the dock board 18. Accordingly, and as best seen in FIG. 17. the lip is now firmly supported at three contact points defined by the forward and rear edges of the lip 26 and the roller pins 108. This keeps the lip 26 firmly in place and avoids rocking as fork trucks travel over the dock board 18. To the extent dictated by geometry and the actual clearances of an individual unit, the tracks 80 and 86 will pivot around the pivot axis 74 (FIG. 8) as needed to bring the contact points into firm engagement.

To bring the dock leveler 12 back to the idle position following use, the cylinder 36 is once again extended to raise the dock board 18. This relieves pressure on the contact points and enables the lip 26 to once again float above the upper surface of the dock board 18. The lip is then retracted, which allows the stops 112 to fall back to the vertical position. The cylinder is then retracted to bring the dock board back to the idle position with the stops 112 received in the support channel 114 as shown in FIG. 14.

One principal advantage of the linearly translatable lip 26 is that, when a truck 16 is backed up against the loading dock, the lip can be extended after raising the dock board 18 only slightly above the level of the truck trailer 16. This is in contrast to prior dock levelers having pivotally attached lips wherein it was necessary to raise the dock leveler substantially above the height of the truck bed in order to provide sufficient clearance for swinging the lip out to its use position. To avoid pinch hazards between the dock leveler and the floor of the loading dock, such prior levelers needed complicated structures along their sides that would extend as the dock levelers were raised and would collapse as the dock levelers were lowered. Such collapsing structures were necessitated by the need to raise the levelers to extreme heights in order to provide clearance for extending the pivoting lip. Because the dock leveler 12 of the present invention need not be raised as high in order to extend the lip 26, the need for complicated side structures is avoided. As illustrated in FIG. 1, the side panels 24 of the dock board 18 are made sufficiently wide so that, when the dock board 18 is raised to the maximum height needed to accommodate a standard truck trailer 16, the lower edge of each side panel remains below the level of the facility floor 14. Each side panel 24 thus serves as an effective shield keeping toes 64 and other body parts from being pinched between the dock board 18 and the facility floor 14. Because the linearly translatable lip 26 substantially reduces the maximum height to which the dock board 18 must be raised, it is practical to provide such side protection with a simple side panel or plate 24 rather than a complicated and expensive telescoping or collapsing structure necessitated by prior designs.

In practice, the dock leveler 12, including the dock board 18 and the lip 26, are preferably formed of welded steel plate durable enough to withstand the harsh rigors of loading dock service. It will be appreciated that the particulars of any design can be selected to meet the requirements of any particular situation and that the precise dimensions, shapes and configuration herein shown and described are meant to be illustrative rather than limiting.

While a particular embodiment of the invention has been shown and described, it will be obvious to those skilled in the art that changes and modifications can be made without departing from the invention in its broader aspects, and, therefore, the aim in the appended claims is to cover all such changes and modifications as fall within the true spirit and scope of the invention.

We claim:

1. A dock leveler comprising:
   a dock board having an upper surface and a forward end; and
   a unitary lip having a fixed crowned upper surface positioned adjacent the forward end and horizontally translatable between a retracted position wherein the lip is substantially fully inboard of the forward end and an extended position wherein a portion of the lip projects forwardly of the forward end, the lip being oriented substantially adjacent, above and parallel with the upper surface of the dock board.

2. A dock leveler as defined in claim 1 wherein the lip is mounted to the dock board by means of a substantially horizontal track assembly.

3. A dock leveler as defined in claim 2 wherein the track assembly includes pair of tracks mounted substantially horizontally on the dock board and a plurality of elements coupled to the lip and movable along the tracks.

4. A dock leveler as defined in claim 3 wherein the track assembly further includes biasing elements for biasing the lip upwardly relative to the dock board while maintaining the lip substantially above and parallel with the upper surface of the dock board.

5. A dock leveler as defined in claim 4 wherein the biasing elements comprise springs.

6. A dock leveler as defined in claim 1 wherein the lip is oriented substantially adjacent and parallel with the upper surface of the dock board when the lip is in the retracted position and wherein the forward end of the lip is canted downwardly relative to the dock board when the lip is in the extended position.

7. A dock leveler as defined in claim 6 wherein the dock leveler further includes structure for moving the forward end of the lip downwardly when the lip is in the extended position.

8. A dock leveler as defined in claim 7 wherein the structure for biasing the forward end of the lip comprises a cam mechanism.

9. A dock leveler as defined in claim 8 wherein the lip is mounted to the dock board by means of a track assembly and wherein the cam mechanism is included in the track assembly.

10. A lip assembly for a dock leveler comprising:
    a unitary elongate rigid plate having a crowned upper surface; and
    mounting structure coupled to the plate for mounting the plate to a dock leveler in substantially parallel relationship to the upper surface of the dock leveler and for substantially linear movement between a retracted position wherein the plate is substantially fully inboard of the edges of the dock leveler and an extended position wherein a portion of the plate projects past an edge of the dock leveler;
    said lip being dimensioned to extend substantially along an edge of the dock leveler; and
    said mounting structure positioning the rigid plate substantially adjacent the upper surface of the dock leveler.

11. A lip assembly as defined in claim 10 wherein the mounting structure provides for substantially linear translational movement of the rigid plate relative to the dock leveler.

12. A lip assembly as defined in claim 11 wherein the mounting structure biases the rigid plate to a position above the plane of the upper surface of the dock leveler.

13. A lip assembly as defined in claim 12 wherein the mounting structure biases the rigid plate by means of springs.

14. A lip assembly as defined in claim 11 wherein the rigid plate is linearly translated by means of manual energy.

15. A lip assembly as defined in claim 11 wherein the rigid plate is linearly translated by means of externally applied power.

16. A lip assembly as defined in claim 15 wherein the externally applied power comprises hydraulic power.

17. A lip assembly as defined in claim 15 wherein the externally applied power comprises electromechanical power.

18. A dock leveler comprising:
    a substantially rectangular dock board having a forward edge, a rear edge, a pair of spaced side edges and a substantially planar upper surface;
    mounting structure for mounting the dock board for pivoting movement around a substantially horizontal axis so that the forward edge of the dock board can be raised and lowered relative to the rear edge; and
    a unitary substantially rectangular lip mounted adjacent and above the upper surface of the dock board for substantially horizontal movement between an extended position wherein a portion of the lip projects forwardly of the forward end of the dock board by a distance sufficient to engage the interior floor surface of a truck trailer when a truck trailer is positioned adjacent the dock board, and a retracted position wherein the lip does not project forwardly of the forward end of the dock board to so engage the floor surface of a truck trailer.

19. A dock leveler as defined in claim 18 wherein the lip includes a pair of downwardly depending support legs positioned inwardly of and closely adjacent the side edges of the dock board.

20. A dock leveler as defined in claim 19 wherein the dock leveler further includes a pair of tracks mounted adjacent the side edges and a plurality of elements coupled to the support legs of the lip and movable along the tracks.

21. A dock leveler as defined in claim 20 wherein the elements coupled to the support legs comprise wheels movable along the tracks.

22. A dock leveler as defined in claim 21 further including springs for supporting and biasing the tracks to support the lip above the level of the upper surface.

23. A dock leveler as defined in claim 22 wherein the dock board further includes one or more support ribs extending under the upper surface substantially parallel with the sides of the dock board and wherein the lip includes structure engaging the support rib.

24. A dock leveler as defined in claim 23 further including structure coupled to the lip for engaging the support rib to permit limited pivoting movement of the lip relative to the dock board so as to provide three point support for the lip when the lip is engaged with a truck trailer bed.

25. A dock leveler as defined in claim 24 wherein the structure comprises a roller pin coupled to the lip and engaging the undersurface of the rib.

26. A dock leveler as defined in claim 23 wherein the side edges of the dock board are substantially straight.

27. A dock leveler as defined in claim 23 wherein the side edges of the dock board are tapered downwardly adjacent the front edge.

28. A dock leveler comprising:

a dock board having an upper surface and a forward end;

a lip positioned adjacent and above the forward end in substantially parallel relationship therewith and horizontally translatable between a retracted position wherein the lip is substantially fully inboard of the forward end and an extended position wherein a portion of the lip projects forwardly of the forward end, and structure coupled to the dock board for supporting the dock board against downward movement when the lip is in the retracted position and for permitting limited downward movement of the dock board when the lip is in the extended position;

said structure comprising a movable stop that is disposed in a first position when the lip is in the retracted position and is moved to a second position when the lip is in the extended position.

29. A dock leveler as defined in claim 28 wherein the movable stop depends downwardly from the forward end of the dock board when the lip is retracted.

30. A dock leveler comprising:

a substantially rectangular dock board having a forward edge, a rear edge, a pair of spaced side edges and a substantially planar upper surface;

mounting structure for mounting the dock board for pivoting movement around a substantially horizontal axis so that the forward edge of the dock board can be raised and lowered relative to the rear edge; and a substantially rectangular lip mounted adjacent the upper surface of the dock board for substantially horizontal movement between an extended position wherein a portion of the lip projects forwardly of the forward end of the dock board by a distance sufficient to engage the interior floor surface of a truck trailer when a truck trailer is positioned adjacent the dock board, and a retracted position wherein the lip does not project forwardly of the forward end of the dock board to so engage the floor surface of a truck trailer, the lip including a pair of downwardly depending support legs positioned inwardly of and closely adjacent the side edges of the dock board;

a pair of tracks mounted adjacent the side edges of the dock board;

a plurality of wheels coupled to the support legs of the lip and movable along the tracks; and one or more springs for supporting and biasing the tracks to support the lip above the level if the upper surface.

31. A dock leveler as defined in claim 30 wherein the dock board further includes one or more support ribs extending under the upper surface substantially parallel with the sides of the dock board and wherein the lip includes structure engaging the support rib.

32. A dock leveler as defined in claim 31 further including structure coupled to the lip for engaging the support rib to permit limited pivoting movement of the lip relative to the dock board so as to provide three point support for the lip when the lip is engaged with a truck trailer bed.

33. A dock leveler as defined in claim 32 wherein the structure comprises a roller pin coupled to the lip and engaging the undersurface of the rib.

34. A dock leveler as defined in claim 33 wherein the side edges of the dock board are substantially straight.

35. A dock leveler as defined in claim 34 wherein the side edges of the dock board are tapered downwardly adjacent the front edge.

* * * * *